United States Patent [19]

Marion et al.

[11] 4,134,740
[45] Jan. 16, 1979

[54] METHOD FOR ENERGY UTILIZATION IN PRODUCING SYNTHESIS GAS AND RECOVERING UNCONVERTED CARBON

[75] Inventors: Charles P. Marion, Mamaroneck, N.Y.; Harold C. Kaufman; James F. Beall, both of Houston, Tex.; John M. Brady, Missouri City, Tex.; Michael M. Dach, Houston, Tex.; George M. Gulko, Houston, Tex.; Dennis R. Shipman, Houston, Tex.

[73] Assignee: Texaco Inc., New York, N.Y.

[21] Appl. No.: 860,362

[22] Filed: Dec. 14, 1977

[51] Int. Cl.² .................................................. C10J 1/00
[52] U.S. Cl. ...................................... 48/197 R; 48/200; 48/212; 48/215; 252/373
[58] Field of Search .................... 48/197 R, 200, 201, 48/212, 215, DIG. 7; 252/373

[56] References Cited

U.S. PATENT DOCUMENTS

| 3,473,903 | 10/1969 | Paull et al. ............................ 48/212 |
| 3,980,590 | 9/1976 | Marion .................................. 48/212 |

Primary Examiner—S. Leon Bashore
Assistant Examiner—George C. Yeung
Attorney, Agent, or Firm—Thomas H. Whaley; Carl G. Ries; Albert Brent

[57] ABSTRACT

The effluent gas stream from a partial oxidation gas generator is scrubbed with water. A dispersion of particulate carbon and water is produced, mixed with a liquid organic extractant, and separated in a decanter. The overhead stream from the decanter, comprising a dispersion of carbon in the liquid organic extractant, together with small amounts of water, is mixed with extraction oil and heated in a vaporizing operation to produce a vaporized overhead mixture, comprising substantially all of the water and liquid organic extractant, and an unvaporized liquid bottoms dispersion of carbon in extraction oil containing only a minor amount of water and liquid organic extractant. The bottoms dispersion is passed into a steam stripper in counterflow with stripping steam. The overhead from the steam stripper, in admixture with 0 to 100 volume % of the overhead from the vaporizing operation is cooled and condensed to separate water and liquid organic extractant by indirect heat exchange in at least two and preferably three separate heat exchange or condensing zones in series, with a different coolant in each zone. Liquid organic extractant and air or water are coolants in two of the zones and the coolant for any remaining zone is selected from the group: (a) at least a portion of carbon/liquid organic extractant/water dispersion overhead from the decanter, (b) at least a portion of the extraction oil, and (c) mixtures of (a) and (b). The bottoms stream from the steam stripper, comprising carbon and extraction oil may be mixed with hydrocarbonaceous feed and pumped into the gas generator with or without further heating.

28 Claims, 1 Drawing Figure

METHOD FOR ENERGY UTILIZATION IN PRODUCING SYNTHESIS GAS AND RECOVERING UNCONVERTED CARBON

BACKGROUND OF THE INVENTION

1. Field of the Invention

This invention relates to the partial oxidation of hydrocarbonaceous materials. More particularly it pertains to an improved method for energy utilization in producing synthesis gas and recovering unconverted carbon.

2. Description of the Prior Art

The raw gas stream leaving a partial oxidation gas generator may be cooled in a gas cooler and scrubbed with water in a gas scrubbing operation to remove entrained particulate carbon. Alternatively, the raw gas stream may be cooled and cleaned by direct immersion in a quench tank containing water. A carbon-water dispersion is thereby produced. These methods are described in coassigned U.S. Pat. Nos. 3,709,669 and 2,896,927. Recovery of the particulate carbon from the carbon-water by means of a liquid organic extractant, a centrifuge, one or two-stage decanter, and fractional distillation employing reflux and a reboiler is described in coassigned U.S. Pat. Nos. 3,473,903; 3,917,569; and 3,980,592.

SUMMARY

In one important aspect, the subject continuous process relates to a method for producing clean synthesis gas, fuel gas, or reducing gas in the following manner.

(1) reacting by partial oxidation a hydrocarbonaceous fuel with a free oxygen-containing gas in the reaction zone of a free-flow noncatalytic synthesis gas generator at a temperature in the range of about 1,300° to 3500° F. and a pressure in the range of about 1 to 300 atmospheres in the presence of a temperature moderator to produce an effluent gas stream comprising $H_2$, CO, $H_2O$, and containing entrained particulate carbon and at least one member of the group of $CO_2$, $H_2S$, COS, $CH_4$, $A_r$ and $N_2$;

(2) introducing said effluent gas stream into gas-cooling and gas-scrubbing zones in which the gas stream is cooled and contacted with water so as to effect the removal of said particulate carbon from said effluent gas stream and producing a pumpable carbon-water dispersion;

(3) mixing said carbon-water dispersion with sufficient liquid organic extractant preheated by indirect heat exchange in a heat exchange or condensing zone located downstream in the process so as to produce in a decanting zone a bottoms stream of clarified water and a separate pumpable liquid overhead stream of carbon/liquid organic extractant/water dispersion;

(4) mixing the carbon/liquid organic extractant/water dispersion with extraction oil and with or without preheating introducing the mixture into a vaporizing operation where said mixture is heated or flashed or both and separated into a gaseous mixture comprising most of the $H_2O$ and vaporized liquid organic extractant and a separate liquid residue dispersion of carbon in extraction oil containing the remainder of the liquid organic extractant and water in said mixture;

(5) introducing the residue dispersion from (4) into the upper portion of a steam stripping zone; introducing from 0 to 100 volume % of said mixture of steam and vaporized liquid organic extractant from (4) into the upper portion of said steam stripping zone; and passing a stream of stripping steam into the lower portion of said steam stripping zone in counterflow with said liquid residue dispersion;

(6) removing a gaseous overhead mixture of steam and vaporized liquid organic extractant from said stripping zone, and a separate pumpable bottoms dispersion of particulate carbon and extraction oil;

(7) mixing together said gaseous overhead mixture from said stripping zone with any remaining portion of said mixture of steam and vaporized liquid organic extractant from the vaporizing operation in (4); and cooling said gaseous mixture and condensing out the water and liquid organic extractant contained therein by indirect heat exchange in at least two separate heat exchange or condensing zones in series with a different coolant in each zone; wherein liquid organic extractant and air or water are the coolants in two of said heat exchange or condensing zones, and the coolant for any remaining heat exchange or condensing zone is selected from the following group:

(a) at least a portion of the carbon/liquid organic extractant/water dispersion overhead stream from the decanting zone in (3), (b) at least a portion of extraction oil for mixing in (4), and (c) mixtures of (a) and (b);

(8) collecting the condensed water and liquid organic extractant in an accumulator tank; separating said fluids by gravity; and introducing at least a portion of the liquid organic extractant plus any make-up liquid organic extractant into one of said heat exchange or condensing zones in (7) as the coolant, and recycling the liquid organic extractant heated in (7) to (3); and (9) mixing at least a portion of the bottoms dispersion of particulate carbon in extraction oil from step (6) with hydrocarbonaceous feed and optionally with a recycle stream to a surge drum, and with or without additional heating, introducing said mixture into said surge drum; and pumping at least a portion of the mixture from the surge drum into the partial oxidation gas generator as feed.

BRIEF DESCRIPTION OF THE DRAWING

The invention will be further understood by reference to the accompanying drawing. The drawing is a schematic representation of a preferred embodiment of the process.

DESCRIPTION OF THE INVENTION

In the subject process, a raw gas stream, substantially comprising $H_2$, CO, $H_2O$, and at least one gas from the group $CO_2$, $H_2S$, COS, $CH_4$, $N_2$, $A_r$ and containing entrained solids i.e. particulate carbon, and/or ash, is produced by partial oxidation of a hydrocarbonaceous fuel with a free-oxygen containing gas, in the presence of a temperature moderator, in the reaction zone of an unpacked free-flow noncatalytic partial-oxidation gas generator. The atomic ratio of free oxygen to carbon in the fuel (O/C ratio), is in the range of about 0.6 to 1.6, and preferably about 0.8 to 1.4. The reaction time is in the range of about 1 to 10 seconds, and preferably about 2 to 6 seconds. When steam is used as the temperature moderator the steam-to-fuel weight ratio in the reaction zone is in the range of about 0.1 to 5, and preferably about 0.2 to 0.7.

The raw gas stream exits from the reaction zone at a temperature in the range of about 1300° to 3500° F., and preferably 2000° to 2800° F., and at a pressure in the range of about 1 to 300 atmospheres, and preferably 15 to 150 atmospheres.

The composition of the raw gas stream leaving the gas generator is about as follows, in mole percent: $H_2$ 10 to 70, CO 15 to 57, $CO_2$ nil to 25, $H_2O$ 0.1 to 20, $CH_4$ nil to 60, $H_2S$ nil to 2, COS nil to 0.1, $N_2$ nil to 60, and $A_r$ nil to 2.0. Particulate carbon is present in the range of about 0.2 to 20 weight % (basis carbon content in the original feed). Ash may be present in the amount of about nil to 60 weight % of the original hydrocarbonaceous feed. Depending on the composition, the gas stream may be employed as synthesis gas, reducing gas, or fuel gas.

The gas generator comprises a vertical free-flow cylindrically shaped steel pressure vessel lined with refractory, such as shown in coassigned U.S. Pat. No. 2,818,326. There is no obstruction to the free flow of the reaction prodcuts passing through the gas generator. The hot effluent gas stream leaving the gas generator may be optionally passed through a free-flow catch pot. Without any appreciable pressure drop, at least a portion of any entrained solid particles, selected from group ash, carbon, refractory may be separated. The effluent gas stream may be cooled to a temperature in the range of about 350° to 750° F. but above the dew point of water by indirect heat exchange with water in a gas cooler, such as shown and described in coassigned U.S. Pat. No. 3,709,669. By this means by-product steam for use elsewhere in the process may be produced. For example, steam may be produced for use downstream in the process in steam heated exchanger(s) and/or a steam stripper, to be further described. The cooled process gas stream is then cleaned by scrubbing with water in a conventional gas scrubbing zone; for example, the venturi or jet scrubber as shown in Perry's Chemical Engineer's Handbook, Fifth Edition, McGraw-Hill Book Company 1973, FIG. 20-120 and FIG. 20-121 may be used. By this means clean product gas and a dispersion of carbon in water containing carbon in the range of about 0.5 to 3.0 wt. % may be produced. Alternatively, as shown in coassigned U.S. Pat. No. 2,818,326, the hot effluent stream of gas from the reaction zone may be cooled to a temperature in the range of about 180° to 700° F. by direct contact with water in a quench tank. At least a portion of the entrained solids i.e. particulate carbon, ash, are removed from the process gas stream by the turbulent quench water and a pumpable dispersion of particulate carbon and water containing about 0.5 to 3.0 wt. % carbon, and preferably below about 1.5 wt. % is produced in the quench tank. Any remaining entrained solids may be removed from the process gas stream by additional scrubbing with water in the gas scrubbing zone at a temperature in the range of about 180° to 700° F., and a pressure in the range of about 1–300 atmospheres. Suitably the pressure in the scrubbing zone is about the same as that in the gas generator, less ordinary pressure drop in the line.

A wide range of combustible carbon-containing organic materials may be reacted in the gas generator with a free-oxygen containing gas, optionally in the presence of a temperature moderator, to produce the raw gas stream.

The term hydrocarbonaceous as used herein to describe various suitable feedstocks is intended to include liquid hydrocarbons and mixtures of liquid hydrocarbons and carbonaceous materials. Substantially any combustible carbon-containing organic material, or slurries thereof, may be included within the definition of the term "hydrocarbonaceous." For example, there are (1) pumpable slurries of solid carbonaceous fuels, selected from the group lignite, bituminous coal, anthracite coal, particulate carbon, petroleum coke, concentrated sewer sludge and mixtures thereof, in a vaporizable liquid carrier, such as water, liquid hydrocarbon, and mixtures thereof; (2) gas-solid suspensions such as finely ground solid carbonaceous fuels dispersed in either a temperature-moderating gas or in a gaseous hydrocarbon; and (3) gas-liquid-solid dispersions, such as atomized liquid hydrocarbon fuel or water and particulate carbon dispersed in a temperature moderating gas.

The term liquid hydrocarbon, as used herein to describe suitable liquid feedstocks, is intended to include various materials, such as liquefied petroleum gas, petroleum distillates and residua, gasoline, naphtha, kerosine, crude petroleum, asphalt, gas oil, residual oil, reduced crude, tar-sand oil and shale oil, coal derived oil, aromatic hydrocarbons (such as benzene, toluene, xylene fractions), coal tar, cycle gas oil from fluid-catalytic-cracking operations, furfural extract of coker gas oil, and mixtures thereof.

Gaseous hydrocarbon fuels, as used herein to describe suitable gaseous feedstocks, include methane, ethane, propane, butane, pentane, natural gas, water-gas, coke-oven gas, refinery gas, acetylene tail gas, ethylene off-gas, synthesis gas, and mixtures thereof. Solid, gaseous, and liquid feeds may be mixed and used simultaneously; and these may include paraffinic, olefinic, acetylenic, naphthenic, and aromatic compounds in any proportion.

Also included within the definition of the term hydrocarabonaceous are oxygenated hydrocarbonaceous organic materials including carbohydrates, cellulosic materials, aldehydes, organic acids, alcohols, ketones, oxygenated fuel oil, waste liquids and by-products from chemical processes containing oxygenated hydrocarbonaceous organic materials, and mixtures thereof.

The hydrocarbonaceous feed may be at room temperature, or it may be preheated to a temperature up to as high as about 600° to 1200° F. but preferably below its cracking temperature. The hydrocarbonaceous feed may be introduced into the gas-generator burner in liquid phase or in a vaporized mixture with the temperature moderator.

Preferably, the hydrocarbonaceous feed includes at least a portion of a pumpable dispersion of heavy liquid hydrocarbon and particulate carbon. This dispersion has a solids content in the range of about 0.5 to 25 wt. % carbon and preferably about 1.0 to 6.0 wt. %. It is obtained downstream in the process from the bottom of a steam stripping column. The steam stripper bottoms stream, at a temperature in the range of about 180° to 700° F., and preferably about 200° to 550° F., is preferably mixed with fresh liquid hydrocarbon feedstock which is at a temperature in the range of about ambient to 1200° F., and preferably about 180° to 800° F. For example, the fresh liquid hydrocarbon feedstock may be vacuum residue which may be preferably pumped directly from the vacuum still at a temperature in the range of about 650° to 800° F. Advantageously, in such case no reheating of the vacuum residuum is necessary before it is mexed with the hot steam stripper bottoms stream, which also requires no reheating. Accordingly, no reheating of this feed mixture is required before it is charged into the gas generator. Optionally, if it is desired to lower the temperature of the steam stripper bottoms, they may be passed in heat exchange with boiler feed water to produce steam.

Figure 1:
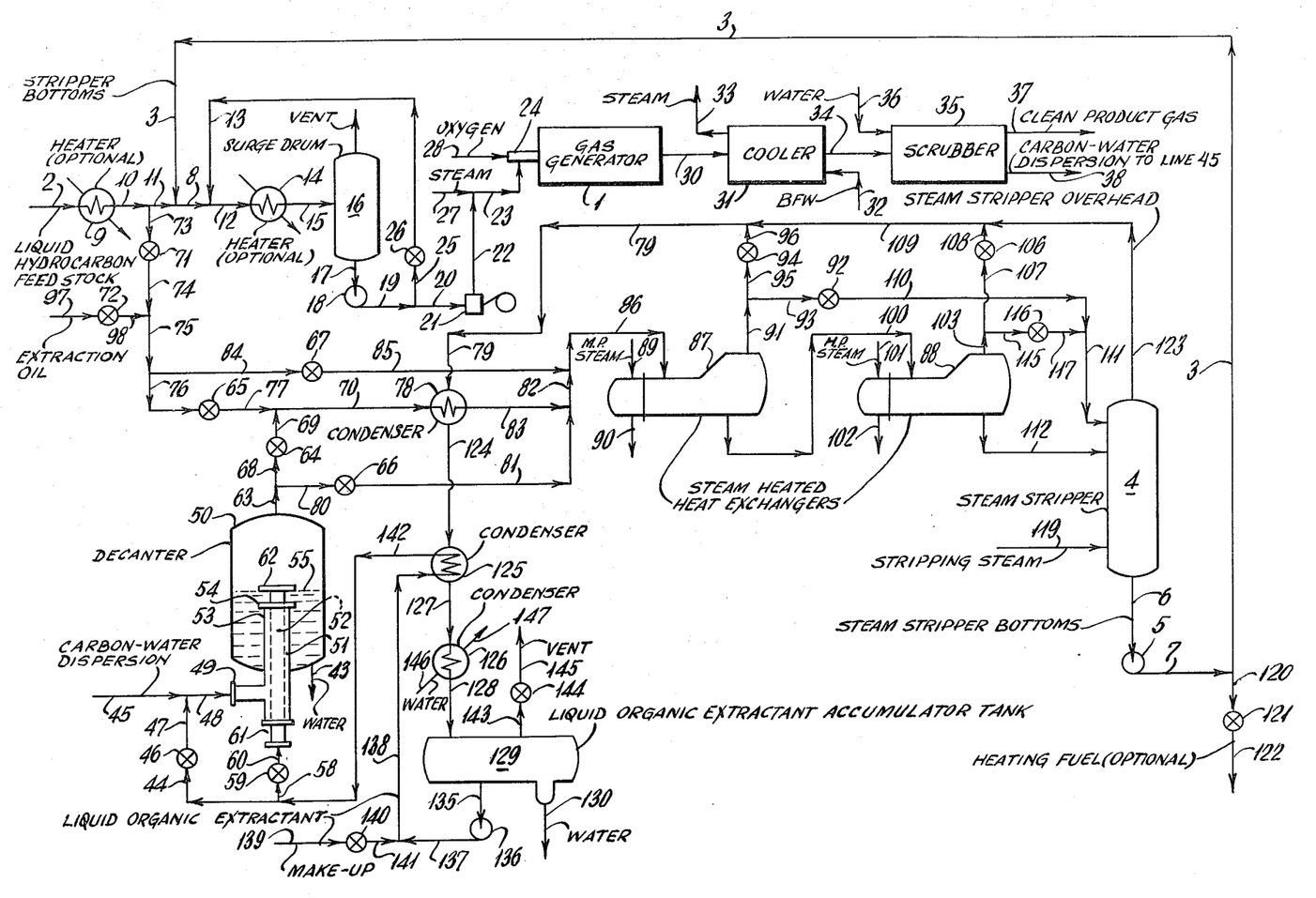

In another embodiment, the fresh hydrocarbonaceous feed is heated with medium pressure steam to a temperature corresponding to the saturation temperature of said steam. The preheated hydrocarbonaceous feed is then mixed with an uncooled portion of the steam stripper bottoms stream, and optionally with a recycled stream from the gas generator charge pump to a surge drum. With or without additional heating, said mixture is introduced into said surge drum. At least a portion of said mixture is pumped from the surge drum into the partial oxidation gas generator as feed, and the remainder comprises said recycle stream. Advantageously, by this means most of the preheating of the fresh hydrocarbonaceous feed may be done for example in heater 9 as shown in the drawing with low cost medium pressure steam. Then if additional heating is required, only a small amount of the comparatively higher cost high pressure steam may be used in heater 14.

The hydrocarbonaceous feed comprises about 0 to 100 wt. %, and preferably 25 to 50 wt. % of steam stripper bottoms and the remainder of fresh make-up liquid hydrocarbon feedstock. This mixture may be maintained in a surge drum at a temperature in the range of about ambient to 600° F., say 375° to 600° F., prior to being pumped into the gas generator. If necessary, a maintenance heater located prior to the surge drum may be used to reach and maintain this temperature.

Optionally, to maintain the temperature and pumpability of heavy liquid hydrocarbon feedstocks i.e. degrees API of about −20 to 20, a portion of feedstock from the bottom of the surge drum is recycled and mixed with the hydrocarbonaceous feed mixture prior to said maintenance heater. Suitable recycle ratios may range from about 0.5 to 10 parts by weight of recycle stream per part by weight of hydrocarbonaceous feed mixture. The uncycled portion of the hydrocarbonaceous feed is pumped from the surge drum through a burner and into the reaction zone of the gas generator, optionally in admixture with steam. A suitable burner is shown in coassigned U.S. Pat. No. 3,874,592.

The need for a temperature moderator to control the temperature in the reaction zone of the gas generator depends in general on the carbon-to-hydrogen ratios of the feedstock and the oxygen content of the oxidant stream. A temperature moderator is used with liquid hydrocarbon fuels and with substantially pure oxygen. Water or steam is the preferred temperature moderator. Steam may be introduced as a temperature moderator in admixture with either or both reactant streams. Alternatively, the temperature moderator may be introduced into the reaction zone of the gas generator by way of a separate conduit in the burner. Other temperature moderators include $CO_2$-rich gas, $N_2$-rich gas, and recycled synthesis gas.

The term free-oxygen containing gas as used herein means air, oxygen-enriched-air i.e. greater than 21 mole % $O_2$, and substantially pure oxygen, i.e. greater than about 95 mole % oxygen (the remainder usually comprising $N_2$ and rare gases). Free-oxygen containing gas may be introduced by way of the partial-oxidation burner at a temperature in the range of about ambient to 1800° F.

It is economically expedient in the subject process to resolve the carbon-water dispersion from the quench and scrubbing operations which may have a carbon content in the range of about 0.5 to 3.0 wt. % and preferably 0.5 to 1.5 wt. % and to recycle the components. Thus, clarified water may be recycled to the gas scrubbing operation and the particulate carbon may be recovered and recycled to the gas generator as a portion of the hydrocarbonaceous feed. By this means there is no net production of carbon in the subject process. This may be done by mixing sufficient liquid organic extractant at a temperature in the range of about 100° to 300° F. and preferably 180° to 250° F. with the carbon-water dispersion at a temperature in the range of about 230° to 350° F. and preferably 250° to 325° F. in a one and preferably two-stage decanting operation, such as described in coassigned U.S. Pat. Nos. 3,980,592 and 4,014,786.

Suitable liquid organic extractants that form dispersions with particulate carbon which are lighter than water include: (1) light liquid hydrocarbon fuels having an atmospheric boiling point in the range of about 100° to 750° F., degrees API in the range of over 20 to about 100, and a carbon number in the range of about 5 to 16, (2) a mixture of liquid organic by-products from an oxo or oxyl process, and (3) mixtures of types (1) and (2). Examples of type (1) liquid extractants include butanes, pentanes, hexanes, toluene, benzene, xylene, gasoline, naphtha, gas oil, their mixtures and the like. Ingredients of type (2) extractants comprise at least one alcohol and at least one ester optionally in admixture with at least one other material from the group shown in Table 1.

TABLE 1

| INGREDIENTS IN LIQUID ORGANIC BY-PRODUCTS OF OXO OR OXYL PROCESS | | |
|---|---|---|
| Group | Carbon Range | Wt. % |
| Alcohols | $C_3$ to $C_{16}$ | 2 to 75 |
| Esters | $C_6$ to $C_{28}$ | 5 to 70 |
| Aldehydes | $C_3$ to $C_{16}$ | Nil to 25 |
| Ketones | $C_3$ to $C_{16}$ | Nil to 25 |
| Ethers | $C_6$ to $C_{28}$ | Nil to 50 |
| Acids | $C_3$ to $C_{16}$ | Nil to 10 |
| Olefins | $C_5$ to $C_{15}$ | Nil to 30 |
| Saturated Hydrocarbons | $C_5$ to $C_{28}$ | Nil to 50 |
| Water | | Nil to 15 |

The oxo process is the commercial application of a chemical reaction called oxonation or, more properly, hydroformylation. In this catalytic reaction, hydrogen and carbon monoxide are added across an olefinic bond to produce aldehydes containing one more carbon atom than the olefinic, and the coproducts shown in TABLE 1.

The oxyl process is a method for directly producing alcohols by catalytically reducing carbon monoxide with hydrogen so as to link several partially reduced carbon atoms together. Essentially it is a modified Fischer-Tropsch Process which preferentially produces oxygenated compounds consisting mainly of alcohols, and the coproducts shown in Table 1.

Advantageously in the subject process, prior to being mixed with the carbon-water dispersion the liquid organic extractant is heated to the proper temperature by indirect i.e. noncontact heat exchange with a steam stripper overhead stream in admixture with from 0 to 100 vol. % of a mixture of steam and vaporized extractant from a vaporizing operation. This step will be subsequently described.

In a two-stage decanter operation for example, sufficient liquid organic extractant is mixed with the carbon-water dispersion in the first stage to release the carbon.

This may range between about 1.5–15 lbs. of liquid organic extractant per lb. of carbon. Simultaneously, the remainder of the liquid organic extractant i.e. about 85 to 95 wt. % of the total is introduced into the second stage of the decanter such as shown in coassigned U.S. Pat. No. 4,014,786, which is incorporated herewith by reference. A dispersion of carbon in liquid organic extractant together with small amounts of water is continuously removed from the top of the decanter. This dispersion comprises 0.5 to 9 wt. % carbon, and preferably 0.5 to 5 wt. % carbon, 1 to 10 wt. % water, and the remainder liquid organic extractant.

The decanter operates at a temperature in the range of about 212° to 650° F. and preferably above 250° F. The pressure in the decanter is basically set by the temperature. The pressure must be at least high enough to keep the liquid organic extractant and the water from vaporizing in the decanter. The maximum pressure in the decanter may be about the same as that in the gas generator less ordinary pressure drop in the lines. Suitably, the pressure may be in the range of about 250–300 psig.

In order to separate the carbon/liquid organic extractant/water overhead dispersion leaving the decanter into its components, extraction oil is mixed with the dispersion. In a vaporizing operation, the resulting mixture is separated into a mixed stream of steam and vaporized organic extractant, and a separate stream of liquid residue. The liquid residue and from 0 to 100 volume % of the mixture of steam and vaporized organic extractant from the vaporizing operation are then introduced into a column and stripped with steam. The overhead from the steam stripping column in admixture with any remaining steam and vaporized organic extractant from the vaporizing operation are cooled below the dew point of the $H_2O$ and organic extractant by indirect heat exchange with a coolant stream in at least two and preferably three separate heat exchange or condensing zones in series. A different coolant stream is used in each zone. Further, there may be one or more heat exchangers or condensers in each zone.

Water and liquid organic extractant are condensed out in said heat exchangers or condensers, and are collected in an accumulator tank. The two immiscible fluids separate by gravity in the accumulator tank and water is drawn off from the bottom. Optionally, this water may be purified and recycled to the scrubbing operation. The accumulator tank may be equipped with a refrigerated vent condenser in order to minimize any offgas losses by vaporization of the liquid organic extractant. The liquid organic extractant is drawn off from the accumulator tank and along with any make-up liquid organic extractant is introduced into one of the heat exchange or condensing zones as the coolant. The liquid organic extractant may be thereby preheated, prior to being recycled to said decanting operation. As a coolant in one of said heat exchange or condensing zones, the liquid organic extractant is passed in indirect heat exchange with the steam stripper overhead plus 0 to 100 volume % of the mixture of steam and organic extractant vapors from the vaporizing operation.

When the temperature of the decanter overhead stream or that of the stream of extraction oil, or mixtures thereof, is too high to permit their use as a coolant in one of said heat exchange or condensing zones, then at least a portion, i.e. 10 to 100 volume % of said streams may by-pass that zone. In such case the mixture of streams goes directly into the vaporizing zone. Preferably, however, the temperature of the decanter overhead stream, or the stream of extraction oil, or mixtures thereof, is low enough to permit their use as a coolant in one of the heat exchange or condensing zones.

Accordingly, in one embodiment of the system in which three heat exchange or condensing zones are used to cool and condense the steam stripper overhead plus 0 to 100 volume % of the steam and vaporized organic extractant from the vaporizing operation, the coolant in the first heat exchange or condensing zone may be at least a portion i.e. 10 to 100 volume %, and preferably 100 volume % of the decanter overhead stream in admixture with at least a portion i.e. 10 to 100 volume %, and preferably 100 volume % of the stream of extraction oil. The by-pass portions of said decanter overhead stream and said stream of extraction oil are mixed with the mixed portions of said fluids that were preheated in said first heat exchange or condensing zone and the resulting mixture is introduced into the vaporizing operation. Further, in said embodiment, the coolant in the second heat exchange or condensing zone is at least a portion i.e. 10 to 100 volume % and preferably 100 volume % of the liquid organic extractant from said accumulator tank plus any make-up liquid organic extractant. The coolant in the third heat exchange or condensing zone is air or water. Further, the coolants in the first two heat exchange or condensing zones may be interchanged.

In another embodiment involving three heat exchange or condensing zones, at least a portion i.e. 10–100 volume % and preferably all of the extraction oil is the coolant in the first or second heat exchange or condensing zone. The preheated and any by-pass portions of said extraction oil are mixed with the carbon/liquid organic extractant/water dispersion from the decanter, and the mixture is introduced into the vaporizing zone. Air or water is the coolant in the third heat exchange or condensing zone. A stream of at least a portion and preferably all of the liquid organic extractant from the accumulator tank plus any make-up liquid organic extractant is the coolant in the remaining heat exchange or condensing zone. The other steps in this embodiment are the same as previously described.

In another embodiment, two heat exchange or condensing zones are used to condense out the water and liquid organic extractant. At least a portion, i.e. 10–100 volume % and preferably 100 volume % of the liquid organic extractant from the accumulator tank plus any make-up liquid organic extractant is the coolant in the first heat exchange or condensing zone; and air or water is the coolant in the second heat exchange or condensing zone.

The carbon/liquid organic extractant/water dispersion leaves overhead from the decanter at a temperature in the range of about 100° to 350° F., such as about 200° to 275° F. The extraction oil enters the system at a temperature in the range of about ambient to 800° F., say about 200° to 600° F. Preferably, the extraction oil is by definition a heavy liquid hydrocarbon fuel having a gravity in degrees API in the range of about −20 to 20. Preferable extraction oils include heavy distillates, residual fuel oil, vacuum residue, asphalt, bunker fuel oil, and mixtures thereof.

The subject process is flexible so that the hydrocarbonaceous feed may be one material while the extraction oil is another. However, a significant economic advantage occurs when these comparatively low cost heavy liquid hydrocarbon extraction oils are also used as at least a portion of the hydrocarbonaceous feed to the gas generator. In one embodiment, all of the hydrocarbonaceous feed is first used as extraction oil. In such case all of the dispersion of carbon in extraction oil from the bottom of the steam stripper constitutes all of the hydrocarbonaceous feed to the generator. By using these materials in the subject process first as an extraction oil, where they are preheated, and then as feed to the gas generator, heating of the feed to the gas generator may be minimized or avoided.

Prior to being introduced into the steam stripper, the mixture of extraction oil, carbon, liquid organic extractant and water, either preheated in a heat exchange or condensing zone or not as previously described, is introduced at a temperature in the range of about 80° to 500° F. to said vaporizing operation which employs heating or flashing or both. By this means, a large portion i.e. about 87–95 volume % or more, of the water and liquid organic extractant is the mixture may be vaporized, prior to the steam stripping operation. For example, in the vaporizing operation at least one, and preferably two steam heated heat exchangers in series may be employed to raise the temperature of the process stream above the vapor point for water and liquid organic extractant.

For example, when two steam heated exchangers in series are employed in the vaporization operation, about 50–95 volume % of the water and liquid organic extractant may be vaporized in the first heated exchanger. A preferable operating pressure is in the range of about 15 to 50 psig in order to promote flashing. The stream of vaporized water and organic extractant and the separate stream of liquid bottoms leave the first exchanger at a temperature in the range of about 270° to 525° F., say 300° to 425° F., and is introduced into the second steam heated exchanger where additional vaporization of water and liquid organic extractant takes place. A preferable operating pressure is the range of about 15 to 200 psig, say 15 to 100 psig. The liquid bottoms or residue dispersion from the last steam exchanger contains less than about 3 mole % of the water and less than about 10 mole % of the liquid organic extractant in the decanter overhead plus substantially all of the carbon and extraction oil. This bottoms stream from the last steam heated heat exchanger or boiler is introduced into the upper portion of a steam stripping column at a temperature in the range of about 420° to 575° F. The liquid bottoms feedstream passes down the column in counterflow with stripping steam. Substantially all of the remaining water and liquid organic extractant in the feedstream is vaporized and passes overhead leaving the stripping column along with the stripping steam at a temperature in the range of about 375° to 700° F., say 425 to 550° F. The particulate carbon forms a pumpable dispersion with the unvaporized extraction oil having a solids content in the range of about 0.5 to 25 wt. %, say 0.5 to 6.0 wt. %. The dispersion is discharged from the bottom of the steam stripper at the same temperature as the overhead stream from the stripping column. As previously described, at least a portion of this stream may be mixed with the hydrocarbonaceous feed, as make-up for the gas generator.

About 0 to 100 vol. % of the overhead vapor stream of steam and vaporized organic extractant from the steam heated exchanger(s) is mixed with all of the steam stripper overhead vapor stream to produce a vapor stream having a temperature in the range of about 275° to 525° F. The remainder of the vapor stream from said steam heated exchanger(s) i.e. 0 to 100 vol. % is introduced into the upper portion of the steam stripper. The split may be determined by stream compositions and operating conditions. For example, in some cases it may be desirable to introduce all of the vapors from the steam heated exchangers into the top of the stripping column in order to prevent any carry over of the extraction oil. On the other hand, it may be more economical to operate in some instances by mixing, outside of the steam stripper, all of the vapors from the steam heated exchangers with all of the overhead stream of vapors from the steam stripper.

The steam stripper operates at a temperature in the range of about 375° to 700° F. and preferably about 425° to 550° F., and a pressure in the range of about 15 to 40 psig. The overhead temperature is at least 50° F. above the dewpoint of water vapor in the overhead stream. There is no reflux, no enriching section, and preferably no reboiler in the steam stripper. The stripping column may contain about 4 to 20 bubble cap trays or sieve trays. About 0.01 to 0.15 lbs. of steam per lb. of liquid bottoms charged to the steam stripper and preferably, 0.02 to 0.07 lbs. per lb. are introduced into the lower end of the steam stripper, at a pressure in the range of about 75 to 350 psig.

Advantageously, the subject process is self-sufficient with respect to steam requirements. Saturated or superheated steam may be produced by cooling the hot effluent gas from the gas generator by indirect heat exchange with water in a gas cooling operation. Thus, medium pressure steam for example in the range of about 70–400 psig, say 250 psig may be produced thereby and used to heat up the first steam heated exchanger and the steam stripper. Similarly, high pressure steam, for example in the range of about 500 to 1500 psig, say 1250 psig, may be produced thereby and used to heat up the second steam heated exchanger. Alternatively, one or two fired preheat boilers may be employed. Optionally, the fuel for such fired preheat boilers may be a portion of the steam stripper bottoms.

Advantageously, by the subject improved separation process employing a steam stripper, thermal and separation efficiencies are maximized, carryover of extraction oil is minimized, and the steam stripper bottoms slurry of extraction oil and carbon is produced at the proper temperature for use as feed to the gas generator.

The steam stripper overhead vapor comprises in mole %: $H_2O$ about 20 to 75, and vaporized liquid organic extractant about 25 to 80. As previously described, after the stripper overhead stream is mixed with 0 to 100 volume % of the overhead vapor stream from the aforesaid vaporizing operation, the gaseous mixture is cooled in at least two and preferably three heat exchange or condensing zones in series to condense out and separate the normally liquid components i.e. water and liquid organic extractant.

The stream of steam stripper overhead vapor in admixture with 0 to 100 volume % of the overhead vapor stream from the aforesaid vaporizing operation may enter the first heat exchange or condensing zone at a temperature in the range of about 275° to 525° F. and a pressure in the range of about 15 to 40 psig, and leaves at a temperature in the range of about 200° to 350° F. and a pressure in the range of about 10 to 31 psig. Further, cooling and condensing of this stream to a temperature in the range of about 140° to 275° F. and a pressure in the range of about 5 to 23 psig may take place in the second heat exchange or condensing zone. Final cooling and condensation of the liquid organic extractant and water to a temperature in the range of about 100° to 180° F. and a pressure in the range of about 1 to 15 psig takes place in the third heat exchange or condensing zone. When only two heat exchange or condensing zones are used, the first cooling step may be taken to the ranges of temperature and pressure for said second heat exchange or condensing zone. The pressure in the accumulator tank in which the condensed out water water and liquid organic extractant are collected and separated may be in the range of about 1 to 15 psig say 5 psig.

By the subject process, capital investment and operating costs are reduced. Advantageously, by eliminating reflux from the stripping tower the diameter of the column is greatly reduced and the enriching section is eliminated. Further, the cost of equipment for condensing the reflux is eliminated; and since there is no reflux to revaporize, the feed heaters are smaller.

The reduced operating expenses are a result of the higher thermal efficiency of the subject process. With no reflux to be reheated, the steam costs for the preheaters are reduced. In an embodiment which utilizes two steam preheaters, a further savings is accomplished by using low cost medium pressure steam for the majority of the heating in the first heater, saving the more expensive high pressure steam for a smaller amount of heating in the second heater. The extensive heat recovery from the overhead stream of the stripper tower also increases the thermal efficiency of the process and reduces both heating and cooling operating expenses.

DESCRIPTION OF THE DRAWING

A more complete understanding of the invention may be had by reference to the accompanying drawing.

The hydrocarbonaceous feed to free-flow noncatalytic refractory lined partial oxidation gas generator 1, in the subject process, comprises a portion of the fresh liquid hydrocarbon feedstock from line 2 and a dispersion of particulate carbon and a heavy liquid hydrocarbon feed in line 3. The later dispersion comprises the stripper bottoms from steam stripper 4. By means of pump 5, at least a portion of the stream of stripper bottoms is pumped through lines 6, 7, 3 and into line 8 where it is mixed with a portion of the fresh liquid hydrocarbon feedstock passing through line 2, optional heater 9 and lines 10-11. When the liquid hydrocarbon feedstock is a heavy fuel oil i.e. API in the range of about −20 to 20, the mixture in line 8 is preferably mixed in line 12 with a recycle stream of feedstock from line 13. From there, optionally the gas generator feedstock passes through maintenance heater 14, and into line 15, and surge drum 16. The hydrocarbonaceous feed in surge drum 16 is pumped into gas generator 1 by way of line 17, circulating pump 18, lines 19, 20 reciprocating pump 21, lines 22, 23 and through the annular passage (not shown) of annulus-type burner 24. Optionally, as previously mentioned, with heavy fuel oil feedstock, the temperature and viscosity of the hydrocarbonaceoous feedstock in surge drum 16 may be maintained by recycling a portion of the feedstock through line 25, valve 26, and line 13.

The other feedstreams to partial oxidation gas generator comprise a temperature moderator i.e. $H_2O$, or $N_2$ in line 27 which is mixed in line 23 with the hydrocarbonaceous feed from line 22; and free-oxygen containing gas i.e. air or substantially pure $O_2$ in line 28 which may be passed through the center passage (not shown) of burner 24.

The effluent stream of raw gas leaves gas generator 1 through line 30. When the hydrocarbonaceous feed to the gas generator includes a high ash solid carbonaceous fuel, a free-flow catch-pot (not shown) may be installed in the line directly after gas generator 1 to remove at least a portion of the particles of ash or other solids i.e. refractory that may be entrained in the effluent gas stream. The gas stream is then passed through gas cooler 31. There it may be cooled by heat exchange with boiler feed water (BFW) which enters through line 32 and which leaves as steam through line 33. The cooled gas stream in line 34 is scrubbed with water in scrubber 35. Water enters from line 36 and contacts the gas stream passing through the scrubber. Scrubber 35 may comprise a conventional venturi scrubber, dip tube, and bubble cap or sieve trays (not shown) to effect contact between the water and the gas and to scrub out the particulate carbon. Clean product gas leaves through line 37 and a dispersion of particulate carbon and water leaves through line 38.

The carbon-water dispersion in line 38 is introduced into line 45 and processed in the following manner to produce the clarified water in lines 46 and 130, and the stripper bottoms dispersion of carbon and extraction oil in line 6.

The carbon-water dispersion in line 45 is mixed with sufficient preheated liquid organic extractant from line 47 to separate the dispersion. The mixture in line 48 passes through inlet 49 of two-stage decanter 50, up through the annular passage 51 between inner pipe 52 and outer pipe 53 and out through lower horizontal radial nozzle 54. The particulate carbon floats to interface level 55. Clarified water settles out by gravity below the interface level, and is continuously drawn off through line 46. This water may then be recycled to scrubber 35 through line 36 after purification. Additional preheated liquid organic extractant from line 60 passes up through inlet 61, inner pipe 52, and is discharged through upper horizontal radial nozzle 62. This liquid organic extractant picks up the particulate carbon at interface and carries it out of decanter 50 through line 63 as a carbon-liquid organic extractant dispersion.

By suitably manipulating valves 64–67 from 0 to 100 volume % of the decanter overhead in line 63, and from 0 to 100 volume % of the heavy liquid hydrocarbon fuel in line 75, or mixtures thereof may be preheated in heat exchanger or condenser 78 by cooling the hot gaseous stream from line 79. When a portion of one or both of said streams in lines 69 and 77 are heated in 78, then the remaining portions of said streams in lines 80 and 84 that by-pass heat exchanger or condenser 78 are mixed in line 86 with the heated fluid from lines 83 and 85. For example, with valves 64 and 65 open and valves 66 and 67 closed, all of the carbon-liquid organic extractant dispersion in line 63 is passed through line 68, valve 64, line 69 and mixed in line 70 with all of the extraction oil which preferably is a portion of the fresh heavy liquid hydrocarbon fuel feedstock from line 2. In such case, with valve 71 open and valve 72 closed, the extraction oil is passed through optional heater 9, lines 10, 73, valve 71, lines 74–76, valve 65, and line 77. Optionally, by closing valve 71 and opening valve 72, a separate stream of extraction oil may be passed through line 97, valve 72, lines 98, 75, 76, valve 65 and line 77. The mixture of extraction oil and carbon-liquid organic extractant, overhead dispersion from the decanter in line 70 is preferably preheated in heat exchanger or condenser 78 by noncontact indirect heat exchange with the steam stripper overhead stream which enters heat exchanger or condenser 78 through line 79 in admixture with from 0 to 100 volume % of the overhead vapors from either one or both steam boilers 87 and 88. The remainder of said overhead vapors from either or both steam boilers 87 and 88 is introduced into steam stripper 4 through line 111.

In an alternate embodiment, all of the decanter overhead or all of the extraction oil by-passes heat exchanger or condenser 78 and is then mixed with the other stream which may be heated in heat exchanger or condenser 78. For example, with valves 65 and 66 open and with valves 64 and 67 closed, the carbon-liquid organic extractant dispersion in line 63 is passed through line 80, valve 66, line 81 and mixed in line 82 with fresh heavy liquid hydrocarbon fuel extraction oil. The extraction oil is passed through lines 75, 76, valve 65, lines 77, 70, preheated in heat exchanger or condenser 78 by cooling the hot vapor stream from line 79, and is then passed through line 83 into line 82. Alternatively, with valve 67 open and valve 65 closed, the fresh heavy liquid hydrocarbon fuel in line 75 may be made to by-pass heat exchanger or condenser 78 by being passed through line 84, valve 67, and lines 85–86. In still another embodiment, all of the valves 64 to 67 may be partially opened.

The preheated liquid dispersion in line 86 comprising particulate carbon/liquid organic extractant/water/extraction oil is heated to flash off the water and liquid organic extractant in steam heated exchangers or steam boilers 87 and 88. Medium pressure steam enters exchanger 87 through line 89 and leaves through line 90. A mixture of steam and some vaporized liquid organic extractant leaves through line 91. With valve 92 in line 93 closed and valve 94 open, this gaseous mixture passes through line 95, valve 94, line 96, and mixes in line 79 with the stripper overhead plus any overhead from exchanger 88 in line 108. The liquid bottoms dispersion from exchanger 87 passes through line 100 into exchanger 88 where it is heated to a higher temperature with high pressure steam which enters through line 101 and leaves through line 102. A mixture of steam and some vaporized liquid organic extractant leaves through overhead line 103. With valve 116 in line 115 closed and 106 open, the gaseous overhead stream from exchanger 88 passes through lines 103, 107, valve 106, line 108 and into 109 where it mixes with the stripper overhead from line 123. Alternatively, by closing valves 94 and 106 part way and by opening valves 92 and 116 part way, a portion of the gaseous overhead stream from exchanger 87 may be passed through line 93, valve 92, line 110 and mixed in line 111 with a portion of the gaseous overhead stream from boiler 88 which passes through lines 103, 115, valve 116 and line 117. The gaseous mixture is then passed through line 111 into the upper portion of steam stripper 4. The hot liquid bottoms stream from heat exchanger 88 comprising a dispersion of particulate carbon, liquid organic extractant, water, and extraction oil, is introduced into the upper portion of steam stripper 4 by way of line 112.

Stripping steam in line 119 is introduced into the lower portion of steam stripper 4. A slurry of particulate carbon and extraction oil leaves through line 6 at the bottom of steam stripper 4, and at least a portion is pumped through lines 7 and 3 by means of pump 5. As mentioned previously, this slurry is mixed in line 8 with the fresh incoming liquid hydrocarbon feestock on the way to gas generator 1. Optionally, a portion of the stripper bottoms in line 7 may be passed through line 120, valve 121, and line 122 and used as furnace fuel. For example, saturated steam from line 33 may be heated with this slurry heating fuel in a boiler (not shown) to produce superheated steam which may be used in boiler 88.

A stream of vaporized organic extractant and $H_2O$ leaves through line 123 at the top of steam stripper 4 and passes through lines 109 and 79 in admixture with any steam and vaporized organic extractant from lines 96 and 108. The gaseous mixture in line 79 is passed into heat exchanger or condenser 78 where it is cooled to condense out water and liquid organic extractant by noncontact heat exchange in the manner previously described.

Further cooling and condensing out of any remaining $H_2O$ and organic extractant in line 124 may take place in serially connected heat exchanger or condenser 125 and optionally in serially connected heat exchanger or condenser 126. Thus, the partially cooled stream leaving heat exchanger or condenser 125 is passed into heat exchanger or condenser 126 by way of line 127. Then the partially cooled stream leaving condenser 126 through line 128 is collected in liquid organic extractant accumulator tank 129. Separation of the fluids by gravity takes place in accumulator tank 129. Water is removed through line 130 at the bottom. This water may be purified and recycled to scrubber 35. Liquid organic extractant in line 135 is pumped by means of pump 136 through lines 137, 138 and into heat exhanger or condenser 125 where it is preheated. Make-up liquid organic extractant may be introduced through line 139, valve 140, and line 141. The preheated liquid organic extractant in line 142 is then introduced into decanter 50 through line 44, valve 46, and lines 47 and 48, and simultaneously through line 58, valve 59 and line 60. Accumulator tank 129 is vented by means of line 143, valve 144, and line 145. The coolant in the last heat exchanger or condenser 126 may be water which enters through line 146 and leaves through line 147. Alternately, heat exchanger or condenser 126 may be air cooled. While the drawing depicts the preferred arrangment, the aforesaid coolant streams in heat exchanger or condensers 78 and 125 may be interchanged. For example, liquid organic extractant may be preheated in heat exchanger or condenser 78 and a liquid mixture comprising at least a portion of the decanter overhead and at least a portion of the fresh liquid hydrocarbon feedstock may be preheated in condenser 125. The quantities and temperatures of the streams may be determined by heat and weight balance.

EXAMPLE

The following example illustrates an embodiment of the process of this invention as shown in the drawing in which the stripper overhead plus overhead from the steam boiler is cooled and condensed by heat exchange with three different coolants in three separate condensers in series. The coolant in the first condenser is a portion of the liquid hydrocarbon feedstock, which also serves as the extraction oil, in admixture with the overhead from the decanter. Liquid organic extractant is preheated in the second condenser prior to introduction into the decanter, for example through lines 48 and 60 in the drawing. Cold water is the coolant in the third condenser. While a preferred mode of operation is illustrated, the Example should not be construed as limiting the scope of the invention. The process is continuous and the flow rates are specified on an hourly basis for all streams of materials.

The hydrocarbonaceous feed to the free-flow noncatalytic partial oxidation gas generator comprises 21,584 lbs. of heavy liquid hydrocarbon fuel oil including stripper bottoms comprising a 5.0 wt. % slurry of particulate carbon and heavy liquid hydrocarbon fuel oil. The composition of the heavy liquid hydrocarbon fuel oil follows: ultimate analysis in wt. % C 84.75, H 10.91, N 0.39, S 3.50 and O 0.40; ash content 0.05 wt. %; gravity 16.0 degrees API; gross heating value 18,239 BTU/lb.; and viscosity CS at 122° F. of 162. The hydrocarbonaceous feed is pumped from the surge drum at a temperature of 540° F. and a pressure of 958 psig, and is mixed with 7,554 lbs. of steam at temperature of 574° F. and a pressure of 958 psig. The hydrocarbon-steam mixture is passed through an annulus-type burner into the reaction zone of the partial oxidation gas generator. The hydrocarbonaceous feed is maintained at the proper temperature prior to its introduction into the gas generator by recycling a portion around the surge drum. 22,914 lbs. of substantially pure oxygen i.e. 99.5 mol % $O_2$ at a temperature of 350° F. and a pressure of 933 psig are simultaneously passed through the center conduit of the burner.

Hot raw synthesis gas leaves the gas generator at a temperature of 2527° F. and a pressure of 843 psig. The effluent gas stream is cooled in a gas cooler to a temperature of 594° F. by converting boiler feed water to steam at a temperature of 574° F. The raw synthesis gas is then scrubbed with water in a scrubbing operation to remove particulate carbon. A carbon-water dispersion containing 1.05 weight % of particulate carbon is thereby produced. 1.092 million standard cubic feet of product gas is produced having the following composition: CO 45.49, $H_2$ 42.54, $CO_2$ 3.19, $H_2S$ 0.72 and COS 0.04, $H_2O$ 7.68, $CH_4$ 0.12, Ar 0.12, $N_2$ 0.10.

35,700 lbs. of carbon-water dispersion from the gas scrubbing operation is mixed with 1,071 lbs. of naphtha and the mixture is charged into a two-stage decanter below the interface layer, as the first stage. The naphtha has an API gravity of 40 minimum and an initial boiling point in the range of 130° to 190° F. 12,424 lbs. of additional naphtha are simultaneously introduced into the decanter as the second stage naphtha. About 34,915 lbs. of clarified water are continuously removed from the bottom of the decanter and returned to the scrubber for cleaning additional raw synthesis gas. About 14,280 lbs. of an overhead stream is continuously removed from the decanter which comprises in weight % naphtha 94.5, carbon 2.5, and water 3.0. The overhead stream is at a temperature of 213° F. and a pressure of 250 psig. 6,783 lbs. of fresh heavy liquid hydrocarbon fuel oil, as previously described, at a temperature of 180° F. are mixed with the decanter overhead. A dispersion is produced which is passed through a first heat exchanger or condenser to cool and condense a gaseous stream of 14,630 pounds per hour comprising the combined overhead streams from two steam heated exchangers and one steam stripper. The dispersion of carbon/naphtha/heavy liquid hydrocarbon fuel/water is preheated in said first heat exchanger or condenser to a temperature of 295° F. This dispersion is then heated further with medium pressure steam i.e. 250 psig, to a temperature of 375° F. in a first steam heated heat exchanger or boiler. The bottoms from first exchanger are heated further with high pressure steam i.e. 1250 psig, to a temperature of 550° F. in a second steam heated exchanger or boiler. The liquid bottoms from the second exchanger are then introduced directly into the upper section of a stripping column and stripped with 400 lbs. of dry steam having a pressure of 250 psig. The steam is introduced into the lower section of the stripping column. The stripper bottoms comprising said slurry of heavy liquid hydocarbon fuel oil and 5.0 wt. % of particulate carbon at a temperature of 525° F. is continuously recycled to the gas generator as a portion of the hydrocarbonaceous feed, as previously described. The stripper overhead comprising substantially all of said naphtha and water in the stripper feed in admixture with the overhead vapors from both steam heated exchangers is then cooled and condensed by indirect heat exchange in three separate heat exchangers or condensers in series. The naphtha-$H_2O$ mixed phase stream leaving the first heat exchanger or condenser, as previously described, is at a temperature of 249° F. This stream is cooled to a temperature of 229° F. in the second heat exchanger or condenser, and then to a temperature of 144.5° F. in the third heat exchanger or condenser. Condensed naphtha from an accumulator tank located after the third heat exchanger or condenser is the coolant in the second heat exchanger or condenser. The naphtha is thereby preheated to a temperature of 180° F. prior to its introduction into the decanting operation. Cooling water is the coolant in the third heat exchanger or condenser.

Obviously, various modifications of the invention as hereinbefore set forth may be made without departing from the spirit and scope thereof, and therefore, only such limitations should be made as are indicated in the appended claims.

We claim:

1. In a process for the partial oxidation of a hydrocarbonaceous feed, slurry of carbonaceous fuel, or mixtures thereof, with a free oxygen-containing gas in the reaction zone of a free-flow noncatalytic gas generator at a temperature in the range of about 1300° to 3500° F. and a pressure in the range of about 1 to 300 atmospheres in the presence of a temperature moderator in a partial oxidation gas generator to produce a gaseous stream comprising $H_2$, CO, $H_2O$ and at least one gas from the group $CO_2$, $N_2$, Ar, $H_2S$, $CH_4$, and COS, and containing particulate carbon; and cooling and cleaning the process gas stream with water to produce a carbon-water dispersion, the improved method for energy utilization in producing said gaseous stream and in the recovery of said unconverted carbon comprising;

(1) mixing said carbon-water dispersion with sufficient liquid organic extractant preheated by indirect heat exchange in a heat exchange or condensing zone as specified in (5) so as to produce in a decanting zone a bottoms stream of clarified water and a separate pumpable liquid overhead stream of carbon/liquid organic extractant/water dispersion;

(2) mixing the carbon/liquid organic extractant/water dispersion with extraction oil, separating said mixture in a vaporizing operation into a mixture of steam and vaporized liquid organic extractant and a separate residue dispersion of carbon in extraction oil containing liquid organic extractant and water;

(3) introducing the residue dispersion from (2) into the upper portion of a steam stripping zone, and introducing from 0 to 100 volume % of said mixture of steam and vaporized liquid organic extractant from (2) into the upper portion of said steam stripping zone; and passing a stream of stripping steam into the lower portion of said steam stripping zone in counterflow with said liquid residue dispersion;

(4) removing a gaseous overhead mixture of steam and vaporized liquid organic extractant from said stripping zone, and removing a separate pumpable bottoms dispersion of particulate carbon in extraction oil;

(5) mixing together said gaseous overhead mixture from said stripping zone with any remaining portion of said mixture of steam and vaporized liquid organic extractant from the vaporizing operation in (2); and cooling said gaseous mixture and condensing out the water and liquid organic extractant contained therein by heat exchange in at least two separate heat exchange or condensing zones in series with a different coolant in each zone; wherein liquid organic extractant is the coolant in one of said heat exchange or condensing zones, air or water is the coolant in another zone, and the coolant for any remaining heat exchange or condensing zone is selected from the following group:
(a) at least a portion of the carbon/liquid organic extractant/water dispersion overhead stream from the decanting zone in (1), (b) at least a portion of extraction oil for mixing in (2), and (c) mixtures of (a) and (b); and (6) collecting the condensed water and liquid organic extractant in an accumulator tank and separating same by gravity; and introducing at least a portion of the liquid organic extractant plus any make-up liquid organic extractant into said heat exchange or condensing zone in (5) as the coolant, and recycling the liquid organic extractant heated in (5) to (1).

2. The process of claim 1 provided with the additional steps of mixing at least a portion of the bottoms dispersion of particulate carbon in extraction oil from step (4) with hydrocarbonaceous feed and optionally with a recycle stream of hydrocarbonaceous feedstock; and with or without additional heating, in a second heat exchange zone, introducing said mixture into said surge drum; and pumping at least a portion of the mixture from the surge drum into the partial oxidation gas generator as feed.

3. The process of claim 1 where in step (5) said gaseous mixture is cooled in three separate condensers in series to condense out water and liquid organic extractant, wherein 10 to 100 volume % of the overhead stream from the decanting zone in step (1) in admixture with 10 to 100 volume % of the extraction oil is the coolant in the first condenser and is thereby preheated and any by-pass portions of the overhead stream from the decanting zone and said stream of extraction oil are mixed with the preheated coolant leaving said first condenser and the resulting mixture is introduced into said vaporizing operation in step (2); and at least a portion of the liquid organic extractant from (6) is the coolant in the second condenser, and air or water is the coolant in the third condenser.

4. The process of claim 1 wherein in step (5) said gaseous mixture is cooled in three separate condensers in series to condense out water and liquid organic extractant; and all of the extraction oil is the coolant in the first condenser and is thereby preheated prior to being mixed in step (2), all of the liquid organic extractant from (6) is the coolant in the second condenser, and air or water is the coolant in the third condenser.

5. The process of claim 1 where in step (5) said gaseous mixture is cooled in three separate condensers in series to condense out water and liquid organic extractant; and all of the mixture of carbon/liquid organic extractant/water dispersion and all of the extraction oil in step (2) is the coolant in the first condenser and is thereby preheated prior to the vaporizing operation, at least a portion of liquid organic extractant from (6) is the coolant in the second condenser, and air or water is the coolant in the third condenser.

6. The process of claim 1 provided with the step of employing a portion of the bottoms dispersion of particulate carbon and extraction oil as fuel in the vaporizing operation in step (2).

7. The process of claim 1 wherein the vaporizing operation in step (2) comprises heating said mixture of carbon/liquid organic extractant/water dispersion and extraction oil in a first steam heated heat exchanger by indirect heat exchange with medium pressure steam thereby producing a gaseous mixture of steam and vaporized liquid organic extractant and a bottom liquid residue comprising a dispersion of carbon/liquid organic extractant/extraction oil/water, and then heating said bottoms liquid residue in a second steam heated heat exchanger by indirect heat exchange with high pressure steam thereby producing a gaseous mixture of steam and vaporized liquid organic extractant and a bottoms liquid residue comprising carbon/extraction oil/water.

8. The process of claim 7 provided with the steps of cooling the gaseous stream from the partial oxidation gas generator in a gas cooling operation by indirect heat exchange with water, thereby producing medium pressure and high pressure steam, and introducing a portion of said medium pressure steam into said first steam heated heat exchanger and into the steam stripping zone as said stripping steam; and introducing said high pressure steam into said second steam heated heat exchanger.

9. The process of claim 1 wherein all of said bottoms dispersion of particulate carbon in extraction oil is introduced into the reaction zone of said gas generator as all of said hydrocarbonaceous feed.

10. The process of claim 1 wherein said liquid organic extractant is a light liquid hydrocarbon having an atmospheric boiling point in the range of about 100° to 750° F., degrees API in the range of over 20 to about 100, and a carbon number in the range of about 5 to 16.

11. The process of claim 1 wherein said liquid organic extractant is a mixture of liquid organic by-products from an oxo process consisting of at least one alcohol and at least one ester in admixture with at least one material from the group aldehydes, ketones, ethers, acids, olefins, saturated hydrocarbons, and water.

12. The process of claim 1 wherein said liquid organic extractant is a light liquid hydrocarbon fuel selected from the group butane, pentane, hexane, toluene, gasoline, naphtha, benzene, xylene, gas oil, and mixtures thereof.

13. The process of claim 2 wherein the bottoms dispersion of particulate carbon in extraction oil from the stripping zone is uncooled when mixed with the hydrocarbonaceous feed which is at a temperature corresponding to the saturation temperature of medium pressure steam with which it was heated by in a first heat exchange zone.

14. The process of claim 13 wherein prior to being introduced into said surge tank, said mixture is heated in a second heat exchange zone with high pressure steam, and wherein the medium pressure steam used in said first heat exchange zone and the high pressure steam used in said second heat exchange zone are produced in a gas cooling operation in which the gaseous stream from the gas generator is cooled by indirect heat exchange with water.

15. The process of claim 1 in which said hydrocarbonaceous feedstock is selected from the group consisting if liquified petroleum gas, petroleum distillates and residua, naphtha, kerosine, gas oil, residual oil, reduced crude, crude petroleum, asphalt, coal tar, coal-derived oil, shale oil, aromatic hydrocarbons, cycle gas oil from fluid-catalytic cracking operations, furfural extract of coker gas oil, tarsand oil and mixtures thereof.

16. The process of claim 1 wherein said slurries of solid carbonaceous fuels are selected from the group lignite, bituminous coal, anthracite coal, petroleum coke, and particulate carbon in water, liquid hydrocarbon, or mixtures thereof.

17. The process of claim 1 wherein said hydrocarbonaceous feed is an oxygenated hydrocarbonaceous organic material selected from the group carbohydrates, cellulosic materials, aldehydes, organic acids, alcohols, ketones, oxygenated fuel oil, waste liquids and by-products from chemical processes containing oxygenated hydrocarbonaceous organic materials, and mixtures thereof.

18. The process of claim 1 wherein said free-oxygen containing gas is selected from the group air, oxygen-enriched air, i.e. greater than 21 mole % $O_2$, and substantially pure oxygen, i.e. greater than about 95 mole % oxygen.

19. The process of claim 1 wherein said temperature moderator is selected from the group water, steam, recycled synthesis gas, $CO_2$-rich gas, and $N_2$-rich gas.

20. The process of claim 1 wherein said extraction oil is a heavy liquid hydrocarbon fuel having a gravity in degrees API in the range of about −20 to 25.

21. The process of claim 20 wherein said extraction oil is a portion of said hydrocarbonaceous feedstock to the gas generator.

22. In a process for the partial oxidation of a hydrocarbonaceous feed, a slurry of carbonaceous fuel, or mixtures thereof with a free oxygen-containing gas in the reaction zone of a free-flow noncatalytic gas generator at a temperature in the range of about 1300° to 3500° F. and a pressure in the range of about 1 to 300 atmospheres in the presence of a temperature moderator to produce a gaseous stream comprising $H_2$, CO, $H_2O$ and at least one gas from the group $CO_2$, $N_2$, Ar, $H_2S$, $CH_4$, COS, and containing particulate carbon; and cooling and cleaning the process gas stream with water to produce a carbon-water dispersion, the improved method for energy utilization in producing said gaseous stream and in the recovery of said unconverted carbon comprising:

(1) mixing said carbon-water dispersion with liquid organic extractant preheated by indirect heat exchange in a heat exchange or condensing zone as specified in (5), and producing in a decanting zone a bottoms stream of clarified water and a separate pumpable liquid overhead stream of carbon/liquid organic extractant/water dispersion having a carbon content in the range of about 0.5 to 3.0 wt. %;

(2) heating at least a portion of said carbon/liquid organic extractant/water dispersion by indirect heat exchange in a heat exchange or condensing zone as specified (5) and by-passing said zone with the remainder of said carbon/liquid organic extractant/water dispersion if any; mixing the preheated and by-pass portions of said carbon/liquid organic extractant/water dispersion with extraction oil, and separating said mixture in a vaporizing operation into a mixture of steam and vaporized liquid organic extractant and a separate liquid residue dispersion of carbon-extraction oil containing liquid organic extractant and water;

(3) introducing the liquid residue dispersion from (2) into the upper portion of a steam stripping zone; and introducing from 0 to 100 volume % of said mixture of steam and vaporized liquid organic extractant from (2) into the upper portion of said steam stripping zone; and passing a stream of stripping steam into the lower portion of said steam stripping zone in counter flow with said liquid residue dispersion;

(4) removing a gaseous overhead mixture of steam and vaporized liquid organic extractant from said stripping zone, and removing a separate pumpable bottoms dispersion of particulate carbon and extraction oil having a carbon content in the range of about 0.5 to 25 wt. %;

(5) mixing together said gaseous overhead mixture from said stripping zone with the remaining portion of said mixture of steam and vaporized liquid organic extractant from the vaporizing operation in (2), if any; and cooling said gaseous mixture and condensing out the water and liquid organic extractant contained therein by indirect heat exchange in three separate heat exchanger or condensing zones in series with a different coolant in each zone; wherein at least a portion of the carbon/liquid organic extractant/water dispersion overhead stream from the decanting zone in (1) is the coolant in the first or second heat exchange or condensing zone, and is thereby preheated as provided in (2), water or air is the coolant in the third heat exchange or condensing zone, and liquid organic extractant is the coolant in the remaining heat exchange or condensing zone and is thereby preheated before being mixed with said carbon-water dispersion in (1);

(6) collecting the condensed water and liquid organic extractant in an accumulator tank and separating same by gravity and introducing at least a portion of the liquid organic extractant plus any make-up liquid extractant into said remaining heat exchange or condensing zone in (5) as said coolant; (7) mixing at least a portion of the bottoms dispersion of particulate carbon in extraction oil from (4) with hydrocarbonaceous feed and optionally with a recycle stream of hydrocarbonaceous feedstock, and with or without additional heating, introducing the mixture into said surge drum; and (8) pumping at least a portion of the mixture from the surge drum into the partial oxidation gas generator as feed.

23. The process of claim 22 where in step (5) all of the liquid overhead stream of carbon/liquid organic extractant water dispersion from step (1) is the coolant in the first heat exchange and condensing zone, and all of the liquid organic extractant from step (6) is the coolant in the second heat exchange and condensing zone.

24. In a process for the partial oxidation of a hydrocarbonaceous feed, a slurry of carbonaceous fuel, or mixtures thereof with a free oxygen-containing gas in the reaction zone of a free-flow noncatalytic gas generator at a temperature in the range of about 1300° to 3500° F. and a pressure in the range of about 1 to 300 atmospheres in the presence of a temperature moderator to produce a gaseous stream comprising $H_2$, CO, $H_2O$ and at least one gas from the group $CO_2$, $N_2$, Ar, $H_2S$, $CH_4$, COS, and containing particulate carbon; and cooling and cleaning the process gas stream with water to produce a carbon-water dispersion, the improved method for energy utilization in producing said gaseous stream and in the recovery of said unconverted carbon comprising:

(1) mixing said carbon-water dispersion with liquid organic extractant preheated by indirect heat exchange in a heat exchange or condensing zone as specified in (5) and producing in a decanting zone a bottoms stream of clarified water and a separate pumpable liquid overhead stream of carbon/liquid organic extractant/water dispersion having a carbon content in the range of about 0.5 to 3.0 wt. %;

(2) preheating at least a portion of extraction oil by indirect heat exchange in a heat exchange or condensing zone as specified in (5) and by-passing said zone with the remainder of said extraction oil if any; mixing the preheated and any by-pass portions of said extraction oil with said carbon/liquid organic extractant/water dispersion from (1), and separating said mixture in a vaporizing operation into a mixture of steam and vaporized liquid organic extractant and a separate liquid residue dispersion of carbon-extraction oil containing some liquid organic extractant and water;

(3) introducing the liquid residue dispersion from (2) into the upper portion of a steam stripping zone; and introducing from 0 to 100 volume % of said mixture of steam and vaporized liquid organic extractant from (2) into the upper portion of said steam stripping zone; and passing a stream of stripping steam into the lower portion of said steam stripping zone in counterflow with said liquid residue dispersion;

(4) removing a gaseous overhead mixture of steam and vaporized liquid organic extractant from said stripping zone, and removing a separate pumpable bottoms dispersion of particulate carbon and extraction oil having a carbon content in the range of at least 0.5 to 25 wt. %;

(5) mixing together said gaseous overhead mixture from said stripping zone with the remaining portion of said mixture of steam and vaporized liquid organic extractant from the vaporizing operation in (2), if any; and cooling said gaseous mixture and condensing out the water and liquid organic extractant contained therein by indirect heat exchange in three separate heat exchange or condensing zones in series with a different coolant in each zone; wherein at least a portion of said extraction oil is the coolant in the first or second heat exchange or condensing zone and is thereby preheated before being mixed in (2); air or water is the coolant in the third heat exchange or condensing zone; and liquid organic extractant is the coolant in the remaining heat exchange or condensing zone, and is thereby preheated before being mixed in (1) with said carbon-water dispersion;

(6) collecting the condensed water and liquid organic extractant in the accumulator tank and separating same by gravity and introducing at least a portion of said liquid organic extractant plus any make-up liquid organic extractant into said remaining heat exchange or condensing zone in (5) as said coolant;

(7) mixing at least a portion of the bottoms dispersion of particulate carbon in extraction oil from (4) with hydrocarbonaceous feed and optionally with a recycle stream of hydrocarbonaceous feedstock, and with or without additional heating, introducing said mixture into said surge drum; and (8) pumping at least a portion of the mixture from the surge drum into the partial oxidation gas generator as feed.

25. The process of claim 24 where in step (5) all of said extraction oil is the coolant in the first heat exchange or condensing zone and is thereby preheated prior to being introduced into step (2), and all of the liquid organic extractant that is mixed with the carbon-water dispersion in step (1) is first introduced into the second heat exchange or condensing zone as the coolant.

26. In a process for the partial oxidation of a hydrocarbonaceous feed, a slurry or carbonaceous fuel, or mixtures thereof with a free oxygen-containing gas in the reaction zone of a free-flow noncatalytic gas generator at a temperature in the range of about 1300° to 3500° F. and a pressure in the range of about 1 to 300 atmospheres in the presence of a temperature moderator to produce a gaseous steam comprising $H_2$, CO, $H_2O$ and at least one gas from the group $CO_2$, $N_2$, Ar, $H_2S$, $CH_4$, COS, and containing particulate carbon; and cooling and cleaning the process gas stream with water to produce a carbon-water dispersion, the improved method for energy utilization in producing said gaseous stream and in the recovery of said unconverted carbon comprising;

(1) mixing said carbon-water dispersion with sufficient liquid organic extractant preheated by indirect heat exchange in a heat exchange or condensing zone as specified in (5) and producing in a decanting zone a bottoms stream of clarified water and a separate pumpable liquid overhead stream of carbon/liquid organic extractant/water dispersion having a carbon content in the range of about 0.5 to 3.0 wt. %;

(2) preheating at least a portion of said carbon/liquid organic extractant/water dispersion in admixture with at least a portion of extraction oil by indirect heat exchange in a heat exchange or condensing zone as specified (5), and by-passing said zone with the remainder of said carbon/liquid organic extractant/water dispersion and extraction oil if any; mixing the preheated and by-pass portions of said carbon/liquid organic extractant/water dispersion and extraction oil, and separating said mixture in a vaporizing operation into a mixture of steam and vaporized liquid organic extractant and a separate liquid residue dispersion of carbon-extraction oil containing liquid organic extractant and water;

(3) introducing the liquid residue dispersion from (2) into the upper portion of a steam stripping zone; and introducing from 0 to 100 volume % of said mixture of steam and vaporized liquid organic extractant from (2) into the upper portion of said steam stripping zone; and passing a stream of stripping steam into the lower portion of said steam stripping zone in counter flow with said liquid residue dispersion;

(4) removing a gaseous overhead mixture of steam and vaporized liquid organic extractant from said stripping zone, and removing a separate pumpable bottoms dispersion of particulate carbon and extraction oil having a carbon content in the range of about 0.5 to 25 wt. %;

(5) mixing together said gaseous overhead mixture from said stripping zone with the remaining portion of said mixture of steam and vaporized liquid organic extractant from the vaporizing operation in (2), if any; and cooling said gaseous mixture, and condensing out the water and liquid organic extractant contained therein by indirect heat exchange in three separate heat exchange or condensing zones in series with a different coolant in each zone; wherein at least a portion of the carbon/liquid organic extractant/water dispersion overhead stream from the decanting zone in (1) in admixture with at least a portion of extraction oil, is the coolant in the first or second heat exchange or condensing zone and is thereby preheated and mixed in (2), water or air is the coolant in the third heat exchange or condensing zone; and liquid organic extractant is the coolant in the remaining heat exchanger or condnesing zone and is thereby preheated before being mixed with said carbon-water dispersion in (1);

(6) collecting the condensed water and liquid organic extractant in an accumulator tank and separating same by gravity and introducing at least a portion of said liquid organic extractant plus any make-up liquid organic extractant into said remaining heat exchange or condensing zone in (5) as said coolant;

(7) mixing at least a portion of the bottom dispersion of particulate carbon in extraction oil from (4) with hydrocarbonaceous feed and optionally with a recycle stream of hydrocarbonaceous feedstock, and with or without additional heating introducing the mixture into said surge drum; and (8) pumping at least a portion of the mixture from the surge drum into the partial oxidation gas generator as feed.

27. The process of claim 26 where in step (5) all of the liquid overhead stream of carbon/liquid organic extractant/water dispersion from step (1) in admixture with all of the extraction oil is the coolant in the first heat exchange or condensing zone, and all of the liquid organic extractant that is mixed with the carbon-water dispersion in step (1) is first preheated by being introduced into the second heat exchange or condensing zone as the coolant.

28. In a process for the partial oxidation of a hydrocarbonaceous feed, a slurry of carbonaceous fuel, or mixtures thereof with a free oxygen-containing gas in the reaction zone of a free-flow noncatalytic gas generator at a temperature in the range of about 1300° to 3500° F. and a pressure in the range of about 1 to 300 atmospheres in the presence of a temperature moderator to produce a gaseous stream comprising $H_2$, CO, $H_2O$ and at least one gas from the group $CO_2$, $N_2$, Ar, $H_2S$, $CH_4$,COS, and containing particulate carbon; and cooling and cleaning the process gas stream with water to produce a carbon-water dispersion, the improved method for energy utilization in producing said gaseous stream and in the recovery of said unconverted carbon comprising;

(1) mixing said carbon-water dispersion with sufficient liquid organic extractant preheated by indirect heat exchange in a heat exchange or condensing zone as specified in (5) in (5) and producing in a decanting zone a bottoms stream of clarified water and a separate pumpable liquid overhead stream of carbon/liquid organic extractant/water dispersion having a carbon content in the range of about 0.5 to 3.0 wt. %;

(2) mixing said carbon/liquid organic extractant/water dispersion with extraction oil, and separating said mixture in a vaporizing operation into a mixture of steam and vaporized liquid organic extractant and a separate liquid residue dispersion of carbon-extraction oil containing a minor amount of liquid organic extractant and water;

(3) introducing the liquid residue dispersion from (2) into the upper portion of a steam stripping zone, and introducing from 0 to 100 volume % of said mixture of steam and vaporized liquid organic extractant from (2) into the upper portion of said steam stripping zone; and passing a stream of stripping steam into the lower portion of said steam stripping zone in counter flow with said liquid residue dispersion;

(4) removing a gaseous overhead mixture of steam and vaporized liquid organic extractant from said stripping zone, and removing a separate pumpable bottoms dispersion of particulate carbon and extraction oil having a carbon content in the range of about 0.5 to 25 wt. %;

(5) mixing together said gaseous overhead mixture from said stripping zone with any remaining portion of said mixture of steam and vaporized liquid organic extractant from the vaporizing operation in (2); and cooling said gaseous mixture and condensing out the water and liquid organic extractant contained therein by indirect heat exchange in two separate heat exchange or condensing zones in series with a different coolant in each condenser; wherein liquid organic extractant is the coolant in the first heat exchange or condensing zone and is thereby preheated before being mixed with said carbon-water dispersion in (1), and water or air is the coolant in the last heat exchange or condensing zone;

(6) collecting the condensed water and liquid organic extractant in an accumulator tank and separating same by gravity and introducing at least a portion of the liquid organic extractant plus any make-up liquid organic extractant into said first heat exchange or condensing zone in (5) as the coolant;

(7) mixing at least a portion of the bottoms dispersion of particulate carbon in extraction oil from (4) with hydrocarbonaceous feed and optionally with a recycle stream of hydrocarbonaceous feedstock, and with or without additional heating introducing said mixture into said surge drum; and (8) pumping at least a portion of the mixture from the surge drum into the partial oxidation gas generator as feed.

* * * * *

UNITED STATES PATENT AND TRADEMARK OFFICE
CERTIFICATE OF CORRECTION

PATENT NO. : 4,134,740

DATED : January 16, 1979

INVENTOR(S) : Charles P. Marion et al.

It is certified that error appears in the above—identified patent and that said Letters Patent is hereby corrected as shown below:

Column 18, line 23, "bottom" should read -- bottoms --.

Column 19, line 54, "$Ch_4$" should read -- $CH_4$ --.

Column 20, line 4, after "specified" insert -- in --.

Column 22, line 25, after "slurry" change "or" to -- of --.

Column 22, line 31, "steam" should read -- stream --.

Signed and Sealed this

Eleventh Day of November 1980

[SEAL]

Attest:

Attesting Officer

SIDNEY A. DIAMOND

Commissioner of Patents and Trademarks